United States Patent
Mizumaki

(10) Patent No.: US 7,304,408 B2
(45) Date of Patent: Dec. 4, 2007

(54) DRIVING APPARATUS AND LIGHT AMOUNT ADJUSTMENT APPARATUS

(75) Inventor: Masao Mizumaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/167,183

(22) Filed: Jun. 28, 2005

(65) Prior Publication Data
US 2006/0006968 A1 Jan. 12, 2006

(30) Foreign Application Priority Data
Jul. 6, 2004 (JP) .............................. 2004-199402

(51) Int. Cl.
*H02K 21/12* (2006.01)
*H02K 21/16* (2006.01)
*H02K 33/16* (2006.01)
*G03B 9/02* (2006.01)

(52) U.S. Cl. .............................. 310/49 R; 310/156.08; 310/40 MM; 396/508

(58) Field of Classification Search ......... 310/40 MM, 310/49 R, 156.08, 185, 254; 396/463, 508
See application file for complete search history.

(56) References Cited

U.S. PATENT DOCUMENTS 5,780,944 A * 7/1998 Sakamoto .................. 310/49 R

FOREIGN PATENT DOCUMENTS

JP 2000152591 A * 5/2000
JP 2002-049076 2/2002

OTHER PUBLICATIONS

Translation of JP 2000152591 A.*

* cited by examiner

*Primary Examiner*—Karl Tamai
*Assistant Examiner*—David W. Scheuermann
(74) *Attorney, Agent, or Firm*—Fitzpatrick, Cella, Harper & Scinto

(57) ABSTRACT

A driving apparatus includes a magnet that is magnetized to at least two poles in a circumferential direction and fixed to a rotor axis formed with a soft magnetic material, and first and second coils arranged in the same direction as the magnet with respect to the magnet-axis direction and arranged adjacent to an end surface of the magnet in the magnet-axis direction. The first magnetic pole portion is excited by energizing the first coil, and the second magnetic pole portion is excited to a pole opposite to the first magnetic pole portion by energizing the second coil. A yoke portion is formed with a soft magnetic material for supporting the first and second magnetic pole portions. The first magnetic pole portion includes a first coil insertion portion that is inserted to an internal diameter portion of the first coil, and a first magnet facing portion that is arranged to face a magnetized outer circumferential portion of the magnet with a predetermined gap at a predetermined angle. The second magnetic pole portion includes a second coil insertion portion that is inserted to an internal diameter portion of the second coil, and a second magnet facing portion that is arranged to face a magnetized outer circumferential portion of the magnet with a predetermined gap at a predetermined angle.

6 Claims, 13 Drawing Sheets

F I G. 12
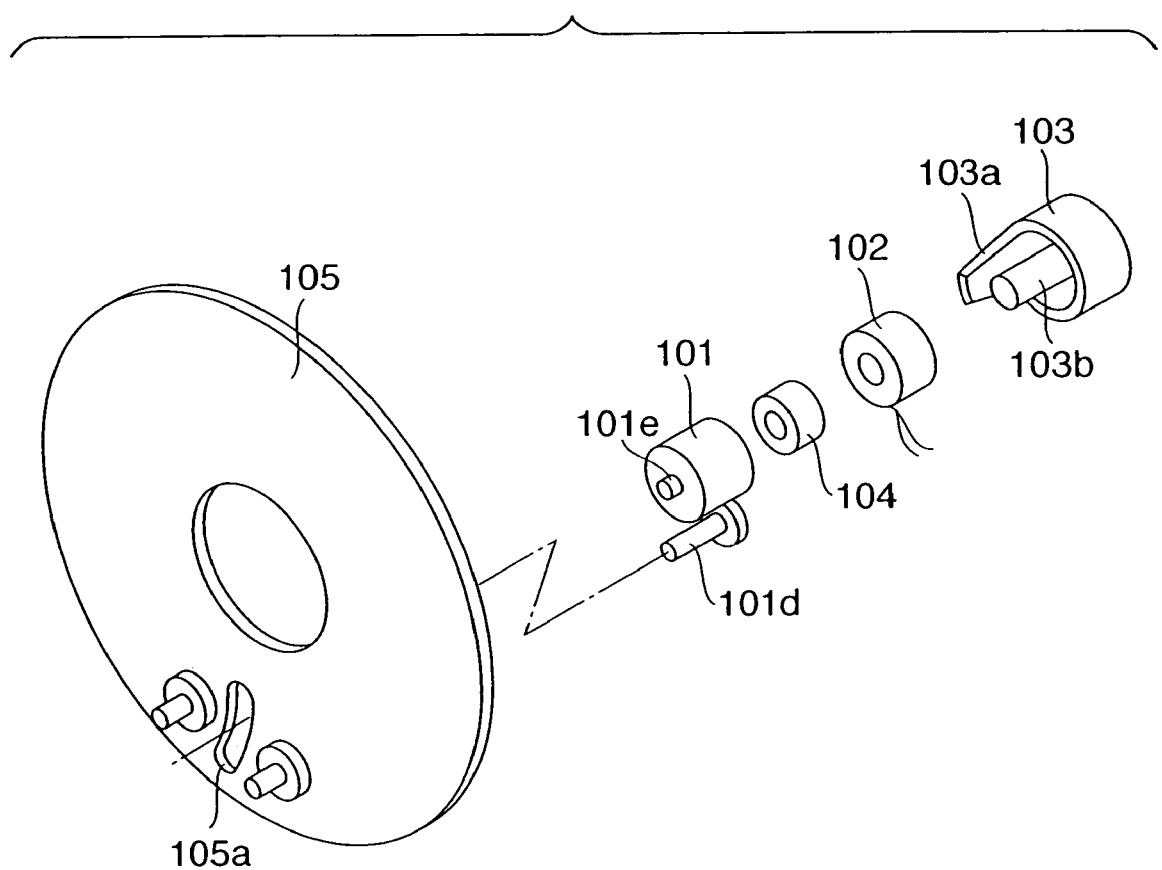

DRIVING APPARATUS AND LIGHT AMOUNT ADJUSTMENT APPARATUS

FIELD OF THE INVENTION

The present invention relates to a driving apparatus suitable for downsizing, and a light amount adjustment apparatus comprising the driving apparatus.

BACKGROUND OF THE INVENTION

Japanese Patent Application Laid-Open No. 2002-049076 discloses a driving apparatus incorporated in a light amount adjustment apparatus, which achieves an increased output and a small diametrical size with the rotation axis in the center. A breakdown perspective view of the driving apparatus is shown in FIG. 12, and a lateral cross-section is shown in FIG. 13.

Numeral 101 denotes a magnet comprising a permanent magnet, which is capable of rotating on a rotation center, and whose outer circumferential surface is divided into two in the circumferential direction so as to be magnetized to the south pole and the north pole alternately. Numeral 102 denotes a coil arranged in the axial direction of the magnet 101. Numeral 103 denotes a stator, which is excited by the coil 102, and which comprises a tooth-shaped outer magnetic pole portion 103a arranged at the end and an inner cylinder 103b. The stator 103 is arranged in a way that the outer magnetic pole portion 103a and the inner cylinder 103b respectively face the outer circumferential surface and the inner circumferential surface of the magnet 101. Numeral 104 denotes an auxiliary stator fixed to the inner cylinder 103b of the stator 103. Together with the inner cylinder 103b, the auxiliary stator 104 serves as an inner magnetic pole portion.

The magnet 101 comprises integratedly molded axes 101e and 101f so that the magnet 101 is held rotatable. The outer magnetic pole portion 103a of the stator 103 faces the outer circumferential surface of the magnet 101 with a gap. Also, the inner cylinder 103b of the stator 103 faces the inner circumferential surface of the magnet 101 with a gap.

In the above-described driving apparatus, the direction of electric application to the coil 102 is switched to change the polarity of the outer magnetic pole portion 103a, the inner cylinder 103b, and the auxiliary stator 104, thereby reciprocatively rotating the magnet 102. The reciprocative rotation of the magnet is controlled by running the driving pin 101d against a guide groove 105a provided on the bottom board 105.

In the driving apparatus, magnetic flux generated by energizing the coil flows from the outer magnetic pole portion to the opposite inner magnetic pole portion, or from the inner magnetic pole portion to the opposite outer magnetic pole portion, thus effectively acting on the magnet positioned between the outer magnetic pole portion and the inner magnetic pole portion. Furthermore, a resistance of the magnetic circuit configured by the outer magnetic pole portion and the inner magnetic pole portion is reduced as much as possible by making the distance between the outer magnetic pole portion and the inner magnetic pole portion equal to the total distance including the thickness of the cylindrical magnet, the gap between the magnet and the outer magnetic pole portion, and the gap between the magnet and the inner magnetic pole portion. The smaller the resistance of the magnetic circuit, the more the magnetic flux can be generated with a small amount of current, thus increasing an output of the driving apparatus.

However, in the construction disclosed in the Japanese Patent Application Laid-Open No. 2002-049076, since there is only one tooth-shaped outer magnetic pole portion 103a, the magnet 101 upon rotation is pulled toward a direction opposite to the outer magnetic pole portion 103a, causing poor balance and a significant loss. If the magnet is magnetized to four poles, two tooth-shaped outer magnetic pole portions can be provided and the rotational balance will improve. However, compared to the magnet magnetized to two poles, the rotation angle decreases by half.

Furthermore, the axial length of the driving apparatus is determined by the length of the coil 102, the length of the magnet 101, and the thickness of the stator 103. The external diameter of the driving apparatus is determined by the external diameter of the inner cylinder 103b, the radial thickness of the coil 102, and the thickness of the outer magnetic pole portion 103a. An increased number of turns in the coil will only be achieved by one of the following: reducing the length of the magnet 101, reducing the thickness of the outer magnetic pole portion 103a, increasing the length of the driving apparatus, or increasing the external diameter of the driving apparatus. Since reducing the length of the magnet causes a decreased output, it is limited. Since reducing the thickness of the outer magnetic pole portion 103a causes magnetic saturation and a decreased output, it is also limited. Therefore, increasing the external diameter of the driving apparatus has been the only way to realize a driving apparatus that achieves an increased output and a short axial length.

Moreover, a predetermined gap is necessary between the internal diameter of the magnet 101 and the auxiliary stator 104 opposite to the magnet 101. Controlling the gap at the time of manufacturing the apparatus causes an increased cost.

Further, the form of the stator calls for the inner cylinder 103b and the outer magnetic pole portion 103a. In the manufacturing process, these parts are difficult to construct integratedly. In a case where these parts are manufactured separately and integrated later, the number of parts will increase and the cost will increase.

Furthermore, reducing the diametrical thickness of the magnet 101 having a cylindrical shape for the purpose of reducing the distance between the outer magnetic pole portion 103a and the auxiliary stator 104 is difficult to achieve from the aspect of mechanical strength.

SUMMARY OF THE INVENTION

The present invention has been proposed in view of the above-described problems, and has as its object to provide a driving apparatus and a light amount adjustment apparatus, which can achieve downsizing of the apparatus, cost reduction, and an increased output.

In order to solve the above-described problems and achieve the object, the present invention provides a driving apparatus comprising: a magnet 8 that is magnetized in a circumferential direction and fixed to a rotor axis formed with a soft magnetic material; first and second coils 4 and 5 arranged on a same side as the magnet with respect to an axial direction of the magnet and arranged adjacent to an end surface of the magnet in the axial direction; a first magnetic pole portion 1 excited by energizing the first coil; a second magnetic pole portion 2 excited to a pole opposite to the first magnetic pole portion by energizing the second coil; and a yoke portion 3 formed with a soft magnetic material for supporting the first and second magnetic pole portions, wherein the first magnetic pole portion includes a first coil insertion portion 1b that is inserted to an internal diameter portion of the first coil, and a first magnet facing portion 1a that is arranged to face a magnetized outer circumferential portion of the magnet with a predetermined gap at a predetermined angle, and the second magnetic pole portion includes a second coil insertion portion 2b that is inserted to an internal diameter portion of the second coil, and a second magnet facing portion 2a that is arranged to face a magnetized outer circumferential portion of the magnet with a predetermined gap at a predetermined angle.

Furthermore, in the above construction, a facing angle (angle α) of the first magnet facing portion that faces the magnet is larger than a facing angle (angle β) of the first coil insertion portion that faces the rotor axis, and a facing angle (angle α) of the second magnet facing portion that faces the magnet is larger than a facing angle (angle β) of the second coil insertion portion that faces the rotor axis.

Furthermore, in the above construction, the first and second magnetic pole portions are extended in parallel with an axial direction of the rotor axis.

Furthermore, in the above construction, the magnet is fixed to the rotor axis while closely contacting the rotor axis.

Furthermore, in the above construction, the first and second coils are connected in series, and have different winding directions.

Furthermore, in the above construction, the driving apparatus forms three magnetic circuits: a first magnetic circuit formed with the first coil, the first magnetic pole portion, the magnet and the rotor axis, and the yoke portion; a second magnetic circuit formed with the second coil, the second magnetic pole portion, the magnet and the rotor axis, and the yoke portion; and a third magnetic circuit formed with the first coil, the second coil, the first magnetic pole portion, the magnet and the rotor axis, the second magnetic pole portion, and the yoke portion.

Furthermore, in the above construction, the driving apparatus further comprises a bobbin portion 6 around which the first and second coils are wound, wherein each of the coils is held on a same plane of the yoke portion through an intermediary of the bobbin portion.

Furthermore, in the above construction, the bobbin portion comprises a first bobbin piece 22 and a second bobbin piece 23, and the respective bobbin pieces are combined and assembled to the yoke portion.

Moreover, the present invention provides a light amount adjustment apparatus comprising: the driving apparatus having any one of the above-described constructions; an output member 10b that operates in accordance with rotation of the magnet; and open-and-close members 13 and 14, connected to the output member, for changing the amount of light that passes through an opening by altering an area of the opening in accordance with an operation position of the output member.

In the above construction, the first magnetic pole portion and the second magnetic pole portion are arranged with 180-degree phase deviation with respect to the center of the magnet magnetized to at least two poles. The first coil and the second coil are connected, for instance, in series and have different winding directions. When the first coil and the second coil connected in series are energized, the first and second magnetic pole portions are excited to opposite poles. By this configuration, while a large rotation angle of the magnet is secured, the rotation balance of the magnet is improved at the time of magnet rotation since the magnet is equally pulled respectively by the first and second magnetic pole portions arranged with 180-degree phase deviation.

Furthermore, since the first magnetic pole portion and the second magnetic pole portion are configured with the coil insertion portion and the magnet facing portion respectively, the width of the magnet facing portion can be made larger than the width of the coil insertion portion. Therefore, a large facing angle of the magnet facing portion can be secured while maintaining the external diameter of the coil. Accordingly, flexibility increases in adjusting the cogging torque generated by the magnet and the outer magnetic pole portion.

Moreover, by fixing the rotor axis to the internal diameter portion of the magnet and by arranging the first and second outer magnetic pole portions opposite to the outer circumferential surface of the magnet, it is possible to realize downsizing, cost reduction, and an increased output of the driving apparatus.

As has been described above, according to the present invention, it is possible to achieve downsizing, cost reduction, and an increased output of the driving apparatus, and also realize stable driving of the apparatus while securing a large rotation angle of the driving apparatus or a large operation angle of a member being driven.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a breakdown perspective view showing a construction of a conventional driving apparatus.

DETAILED DESCRIPTION OF THE PREFERRED EMBODIMENTS

Preferred embodiments of the present invention will now be described in detail in accordance with the accompanying drawings.

Note that the embodiments described below are provided as an example of means for realizing the present invention, that should be corrected or changed as appropriate in accordance with various conditions and a configuration of an apparatus to which the present invention is applied. Therefore, the present invention is not limited to the following embodiments.

First Embodiment

Figure 1:
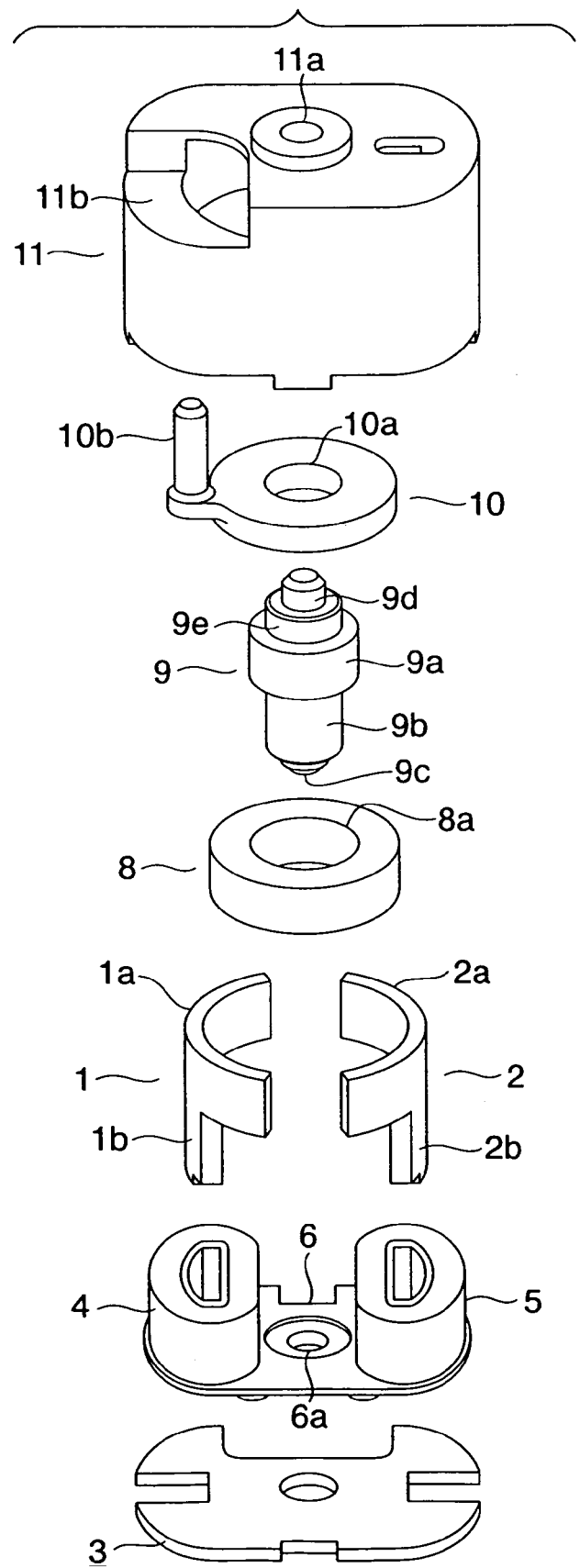
FIG. 1 is a breakdown perspective view of a driving apparatus according to the first embodiment of the present invention.
Figure 2:
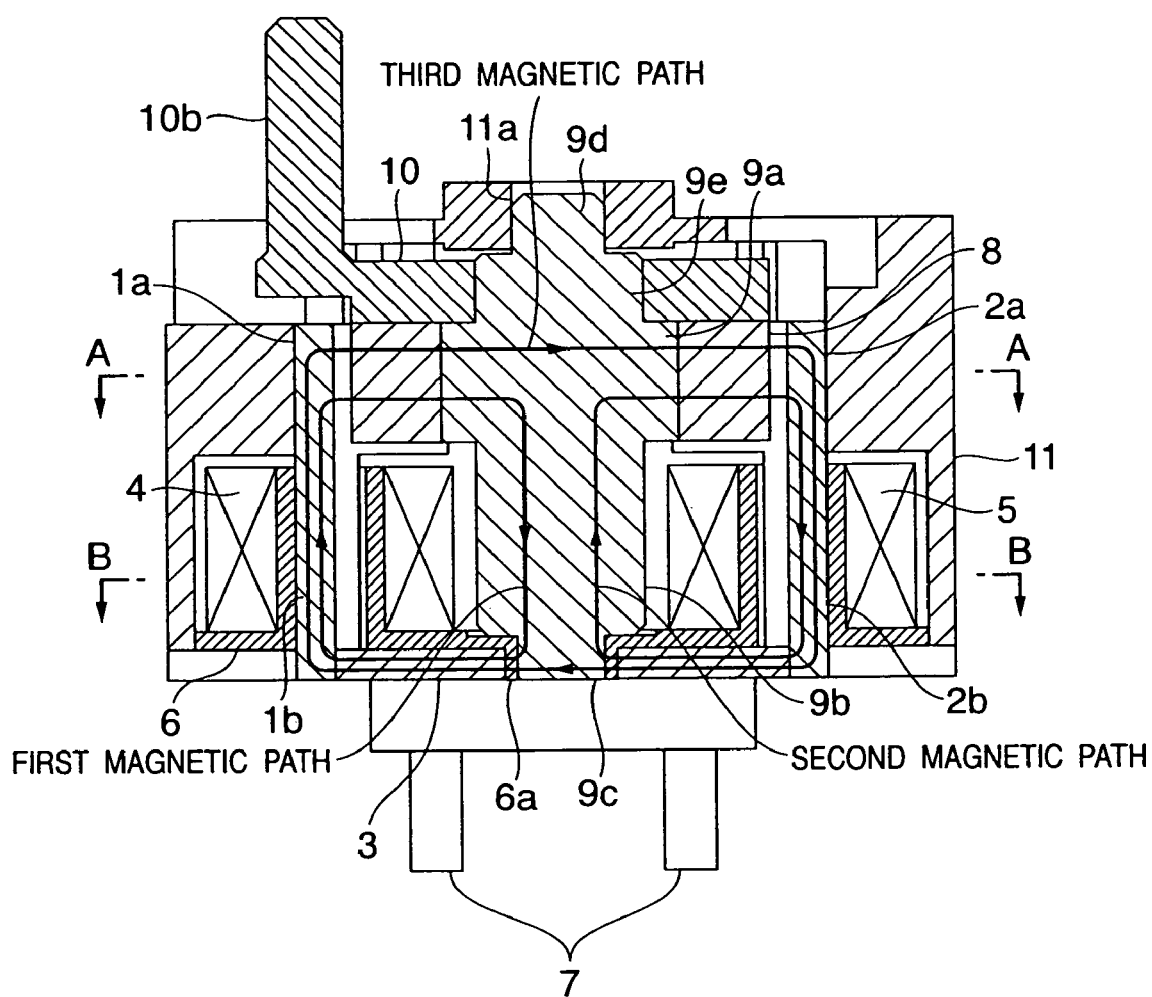
FIG. 2 is a cross-section when the driving apparatus in FIG. 1 is cut along the plane parallel to the rotor axis.
Figure 3:
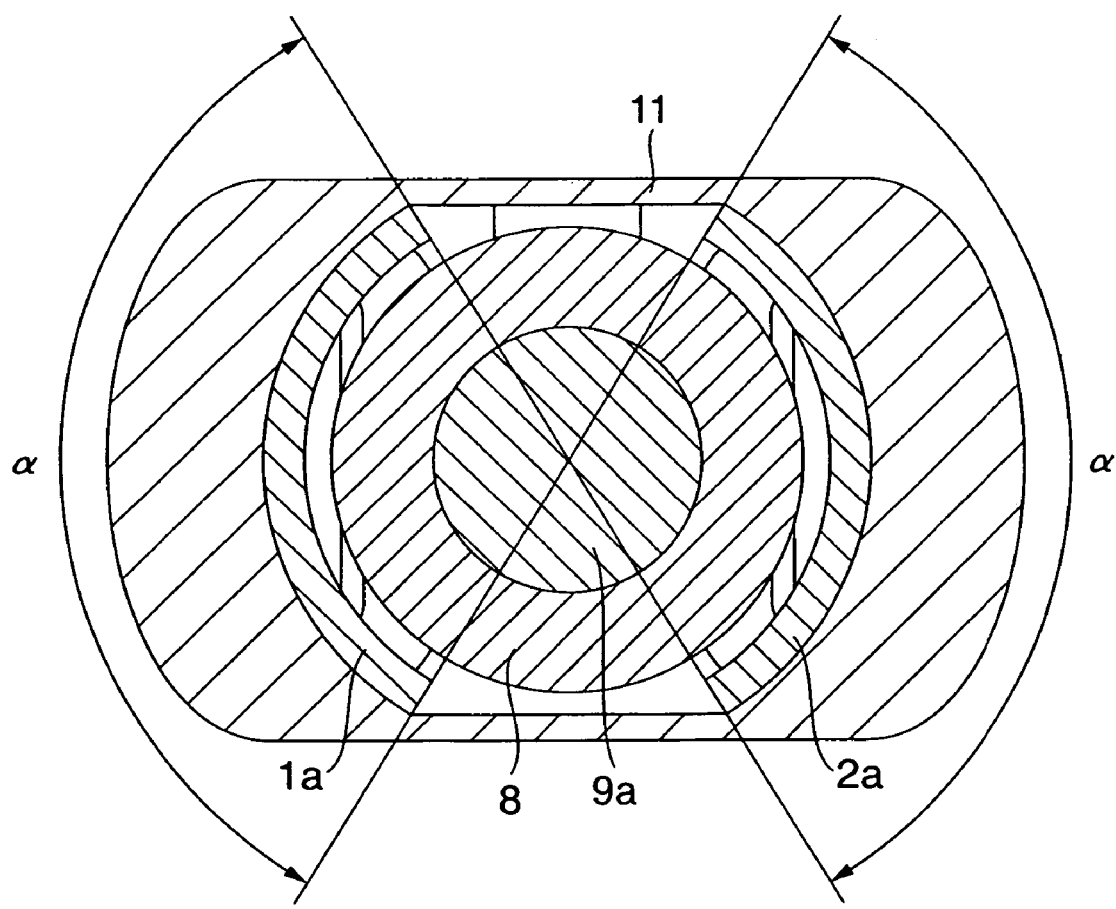
FIG. 3 is a cross-section cut along the line A-A shown in FIG. 2.

FIGS. 1 to 4 show a driving apparatus according to the first embodiment of the present invention. FIG. 1 is a breakdown perspective view; FIG. 2, a cross-section cut along the plane that is parallel to the central axis and that passes through the coil and the rotor axis; FIG. 3, a cross-section cut along the line A-A shown in FIG. 2; and FIG. 4, a cross-section cut along the line B-B shown in FIG. 2.

Referring to FIGS. 1 to 4, numeral 1 denotes a first outer magnetic pole portion formed with a soft magnetic material, consisting of a first magnet facing portion 1a and a first coil insertion portion 1b. Numeral 2 denotes a second outer magnetic pole portion formed with a soft magnetic material, consisting of a second magnet facing portion 2a and a second coil insertion portion 2b. Numeral 3 denotes a main yoke formed with a soft magnetic material, to which the first and second outer magnetic pole portions 1 and 2 are fixed by laser welding, bonding, press-fitting, or caulking. The first and second outer magnetic pole portions 1 and 2 that are fixed to the main yoke 3 are formed in a comb-tooth shape that extends in a direction parallel to the rotor axis 9 as will be described later.

Numeral 4 denotes a first coil wound with a conductive wire; 5, a second coil wound with a conductive wire; and 6, a bobbin where the first coil 4 and the second coil 5 are wound. The first coil 4 wound around the bobbin 6 is fixed by inserting the first coil insertion portion 1b of the first outer magnetic pole portion 1 into the internal diameter of the first coil 4. By energizing the first coil 4, the first outer magnetic pole portion 1 is excited. Similarly, the second coil 5 wound around the bobbin 6 is fixed by inserting the second coil insertion portion 2b of the second outer magnetic pole portion 2 into the internal diameter of the second coil 5. By energizing the second coil 5, the second outer magnetic pole portion 2 is excited.

Since the first coil 4 and the second coil 5 are arranged adjacently to the plane surface of the main yoke 3, the length of the driving apparatus in the axial direction can be made short. Furthermore, since the first coil 4 and the second coil 5 are connected in series and arranged adjacently, the number of turns in the overall coils increases, thus contributing to an increased output, while the length of the driving apparatus in the axial direction is kept short. Furthermore, the first coil 4 and the second coil 5 are connected in series, but have different winding directions. In other words, while the first coil 4 is wound clockwise, the second coil 5 is wound counterclockwise. When the first coil 4 and the second coil 5 connected in series are energized, the first outer magnetic pole portion 1 and the second outer magnetic pole portion 2 are excited to opposite poles. Since the bobbin 6 is provided as single common parts instead of being provided to each of the first coil 4 and the second coil 5, cost reduction can be achieved, and series connection becomes easy. Note that although the first coil 4 and the second coil 5 are connected in series herein, they may be connected in parallel. In a case where the driving apparatus is driven with a constant voltage, the output will increase in parallel connection, but the electric current consumption will increase. Series connection can suppress electric current consumption, compared to parallel connection (when the same coils are used).

Numeral 7 denotes a conductive terminal pin which is buried in the bobbin 6 and connected to the coil ends of the first coil 4 and the second coil 5.

Note that the first outer magnetic pole portion 1 and the second outer magnetic pole portion 2 are fixed to the main yoke 3 while sandwiching the first coil 4 and the second coil 5 in the middle.

Numeral 8 denotes a cylindrical magnet formed with a permanent magnet. The outer circumferential surface of the magnet 8 is divided into two in the circumferential direction, each of which is magnetized to the south pole and the north pole. The inner circumferential surface of the magnet 8 has one of the followings: it has a weaker magnetic distribution than the outer circumferential surface; it is not magnetized at all; or it has an opposite polarity from the outer circumferential surface (i.e., if one area of the outer circumferential surface is magnetized to the south pole, the corresponding area of the inner circumferential surface is magnetized to the north pole). Numeral 9 denotes a rotor axis formed with a soft magnetic material. The outer circumferential surface of the first cylinder portion 9a of the rotor axis 9 is tightly fixed to the inner circumferential surface 8a of the magnet 8 by bonding, press-fitting or the like. The first cylinder portion 9a is fixed to the magnet 8 in a way that the upper end of the magnet 8 in the axial direction is leveled with the upper end of the first cylinder portion 9a (see FIG. 2).

By virtue of fixing the first cylinder portion 9a of the rotor axis 9 to the inner circumferential surface 8a of the magnet 8, no concern is raised in terms of strength even if the radial thickness of the cylindrical magnet 8 is made extremely thin. Supporting axes 9c and 9d, provided on both ends of the rotor axis 9, are rotatably supported by an insertion hole 6a of the bobbin 6 and a cover 11 which will be described later. In this stage, the second cylinder portion 9b of the rotor axis 9 is arranged adjacently between the first coil 4 and the second coil 5 as shown in FIG. 2. The rotor 9 also has a third cylinder portion 9e, to which a lever 10 which will be described later is inserted and fixed.

The first magnet facing portion 1a of the first outer magnetic pole portion 1 and the second magnet facing portion 2a of the second outer magnetic pole portion 2 are arranged to face the outer circumferential surface of the magnet 8 with a predetermined gap. The segment of the first cylinder portion 9a opposite to the first magnet facing portion 1a and the segment of the second cylinder portion 9b that is adjacent to the outer circumference of the first coil 4 constitute a first inner magnetic pole portion. Similarly, the segment of the first cylinder portion 9a opposite to the second magnet facing portion 2a and the segment of the second cylinder portion 9b that is adjacent to the outer circumference of the second coil 5 constitute a second inner magnetic pole portion.

By energizing the first coil 4, the first outer magnetic pole portion 1 and the first inner magnetic pole portion are excited. Between the magnetic poles, magnetic flux traversing the magnet 8 is generated, effectively acting on the magnet 8. In this stage, the first outer magnetic pole portion 1 and the first inner magnetic portion are excited to opposite poles. Similarly, by energizing the second coil 5, the second outer magnetic pole portion 2 and the second inner magnetic pole portion are excited. Between the magnetic poles, magnetic flux traversing the magnet 8 is generated, effectively acting on the magnet 8. In this stage, the second outer magnetic pole portion 2 and the second inner magnetic pole portion are excited to opposite poles.

Since the first coil 4 and the second coil 5 are connected in series but have different winding directions, the first outer magnetic pole portion 1 and the second outer magnetic pole portion 2 are simultaneously excited to opposite poles. By virtue of this, three magnetic circuits can be formed: a first magnetic circuit (first magnetic path) formed with the first coil 4, the first outer magnetic pole portion 1, and the first inner magnetic pole portion; a second magnetic circuit (second magnetic path) formed with the second coil 5, the second outer magnetic pole portion 2, and the second inner magnetic pole portion; and a third magnetic circuit (third magnetic path) formed with the first coil 4, the second coil 5, the first outer magnetic pole portion 1, the first inner magnetic pole portion, the second inner magnetic pole portion, and the second outer magnetic pole portion 2. Accordingly, an output of the driving apparatus can substantially be improved.

The radial thickness of the cylindrical magnet 8 can be made extremely thin as mentioned above. Also, it is not necessary to provide a gap between the inner circumferential surface of the magnet 8 and the first cylinder portion 9a that constitutes the inner magnetic pole portion while facing the inner circumferential surface of the magnet 8. Therefore, the distance between the first magnet facing portion and the first cylinder portion 9a as well as the distance between the second magnet facing portion 2a and the first cylinder portion 9a can be made extremely small. Accordingly, the magnetic resistance of the first, second, and third magnetic circuits can be made small, and the output of the driving apparatus can be improved.

Furthermore, as shown in FIG. 2 since the rotor axis 9 is inserted to the internal diameter of the magnet 8, the magnet 8 is mechanically stronger compared to that of Japanese Patent Application Laid-Open No. 2002-049076. Furthermore, since the rotor axis 9 acts as a so-called back metal that reduces the magnetic resistance between the south pole and the north pole appearing in the internal diameter portion of the magnet 8, a high permeance coefficient of the magnetic circuit is set. Therefore, even if the driving apparatus is used in a high temperature environment, there is little magnetic deterioration caused by degaussing.

Still further, according to Japanese Patent Application Laid-Open No. 2002-049076, the apparatus must be assembled while precisely maintaining a gap between the external diameter of the magnet and the outer magnetic pole portion. In addition, the inner magnetic pole portion opposite to the internal diameter portion of the magnet must be arranged with a predetermined gap with respect to the magnet. If the precision of the parts varies or assembly precision is poor, the gap cannot be assured and an error is highly likely caused by the inner magnetic pole portion coming into contact with the magnet. On the contrary, according to the present embodiment, the gap to be controlled exists only in the external diameter portion of the magnet 8, thus the assembly is easy.

Moreover, according to Japanese Patent Application Laid-Open No. 2002-049076, the inner magnetic pole portion must be configured so as not to come into contact with the portion connecting the magnet and the axis. Because of this configuration, the portion where the inner magnetic pole portion faces the magnet cannot have a sufficient axial length. On the contrary, according to the present embodiment, since the rotor axis also serves as the inner magnetic pole portion, the portion where the inner magnetic portion faces the magnet 8 can secure a sufficient axial length. As a result, it is possible to make effective use of the first outer magnetic pole portion 1, the second magnetic pole portion 2, and the magnet 8, thus enabling to increase an output of the driving apparatus.

Furthermore, since the first outer magnetic pole portion 1 and the second outer magnetic pole portion 2 are formed in a comb-tooth shape that extends in a direction parallel to the rotor axis 9, it is possible to minimize the outermost diameter of the driving apparatus in the direction perpendicular to the rotor axis 9. For instance, if the outer magnetic pole portion were configured with a yoke plate extended in the radial direction of the magnet (direction perpendicular to the axis), the coil would be wound in the radial direction. Even though this would achieve a short axial length, the outermost diameter of the driving apparatus in the direction perpendicular to the axis would become large. On the contrary, according to the present embodiment, the outermost diameter of the driving apparatus in the direction perpendicular to the axis is substantially determined by the magnet 8, the thickness of the first and second outer magnetic pole portions 1 and 2, as well as the winding width of the first and second coils 4 and 5 (see FIG. 2).

Moreover, since the first outer magnetic pole portion 1 and the second outer magnetic pole portion 2 have a comb-tooth shape that extends in a direction parallel to the rotor axis 9, the first coil 4 and the second coil 5 wound around the bobbin 6, as well as the rotor consisting of the magnet 8 and the rotor axis 9 can all be assembled from one direction (from the upper side to the lower side of FIG. 1), making the assembly work easy.

Numeral 10 denotes a lever which is fixed to the magnet 8 and the rotor axis 9 by bonding, press-fitting or the like, thereby integratedly rotatable. In this stage, the third cylinder portion 9e of the rotor axis 9 is inserted to the hole 10a of the lever 10, thereby aligning and fixing the lever 10. On one end of the lever 10, a driving pin 10b is provided. Numeral 11 denotes a cover which is aligned and fixed to the main yoke 3. Numeral 11a denotes a bearing integratedly provided on the cover 11. The supporting axis 9d of the rotor axis 9 is inserted to the bearing 11a, thereby rotatably holding the rotor axis 9. An opening 11b is provided on the cover 11 so that the lever 10 extends from inside the cover 11 to outside through the opening 11b. By virtue of this construction, the lever 10 acts as output means while tightly coming into contact with the magnet 8. In other words, the construction enables to shorten the axial length of the overall driving apparatus including the output means.

When the cover 11 is fixed to the main yoke 3, the rotor axis 9 is inserted to the bearing 11a of the cover 11 and the insertion hole 6a of the bobbin 6, and held rotatable. In this state, as shown in FIG. 2, the outer circumferential surface of the magnet 8 fixed to the rotor axis 9 has a predetermined gap from the first magnet facing portion 1a of the first outer magnetic pole portion 1 and the second magnet facing portion 2a of the second outer magnetic pole portion 2. The lever 10 fixed at one end of the axial direction maintains a predetermined gap from the back surface of the cover 11, and the other end of the axial direction maintains a predetermined gap from the first coil 4 and the second coil 5.

Therefore, the magnet 8 is arranged adjacently to the first coil 4 and the second coil 5 in the axial direction (arranged in the same direction as the magnet's axial direction adjacently to the end surface of the axial direction). Since the magnet 8 is adjacent to the first coil 4 and the second coil 5 with respect to the plane perpendicular to the axial direction, a driving apparatus having a short axial length can be realized.

Figure 4:
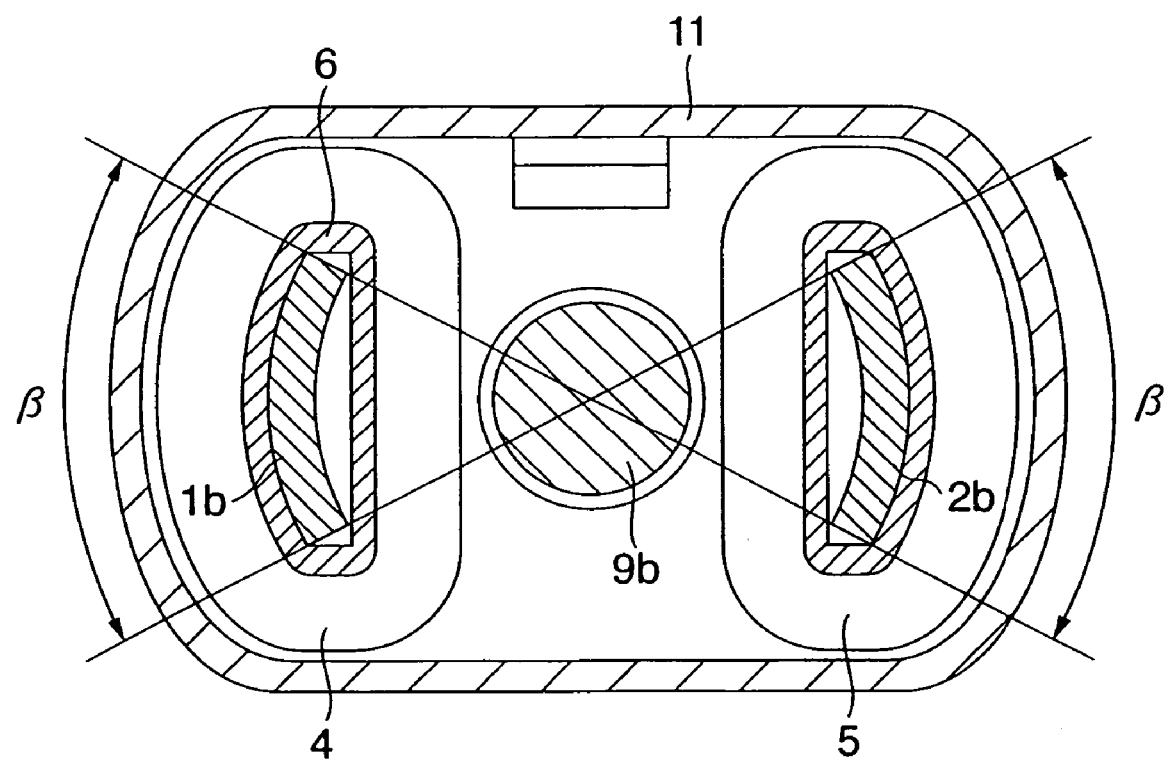
FIG. 4 is a cross-section cut along the line B-B shown in FIG. 2.

The first magnet facing portion 1a of the first outer magnetic pole portion 1 faces the magnet 8 with a facing angle having an angle α as shown in FIG. 3. Similarly, the second magnet facing portion 2a of the second outer magnetic pole portion 2 faces the magnet 8 with a facing angle having an angle α as shown in FIG. 3. The first coil insertion portion 1b of the first outer magnetic pole portion 1 is formed with a facing angle having an angle β. The second coil insertion portion 2b of the second outer magnetic pole portion 2 is formed with a facing angle having an angle β as shown in FIG. 4. The angle α and the angle β have a relation of α>β. In other words, the first magnet facing portion 1a is formed wider than the first coil insertion portion 1b, and the second magnet facing portion 2a is formed wider than the second coil insertion portion 2b.

Herein, cogging torque generated in the magnet 8, the first magnet facing portion 1a, and the second magnet facing portion 2a is explained with reference to FIG. 5.

Figure 5:
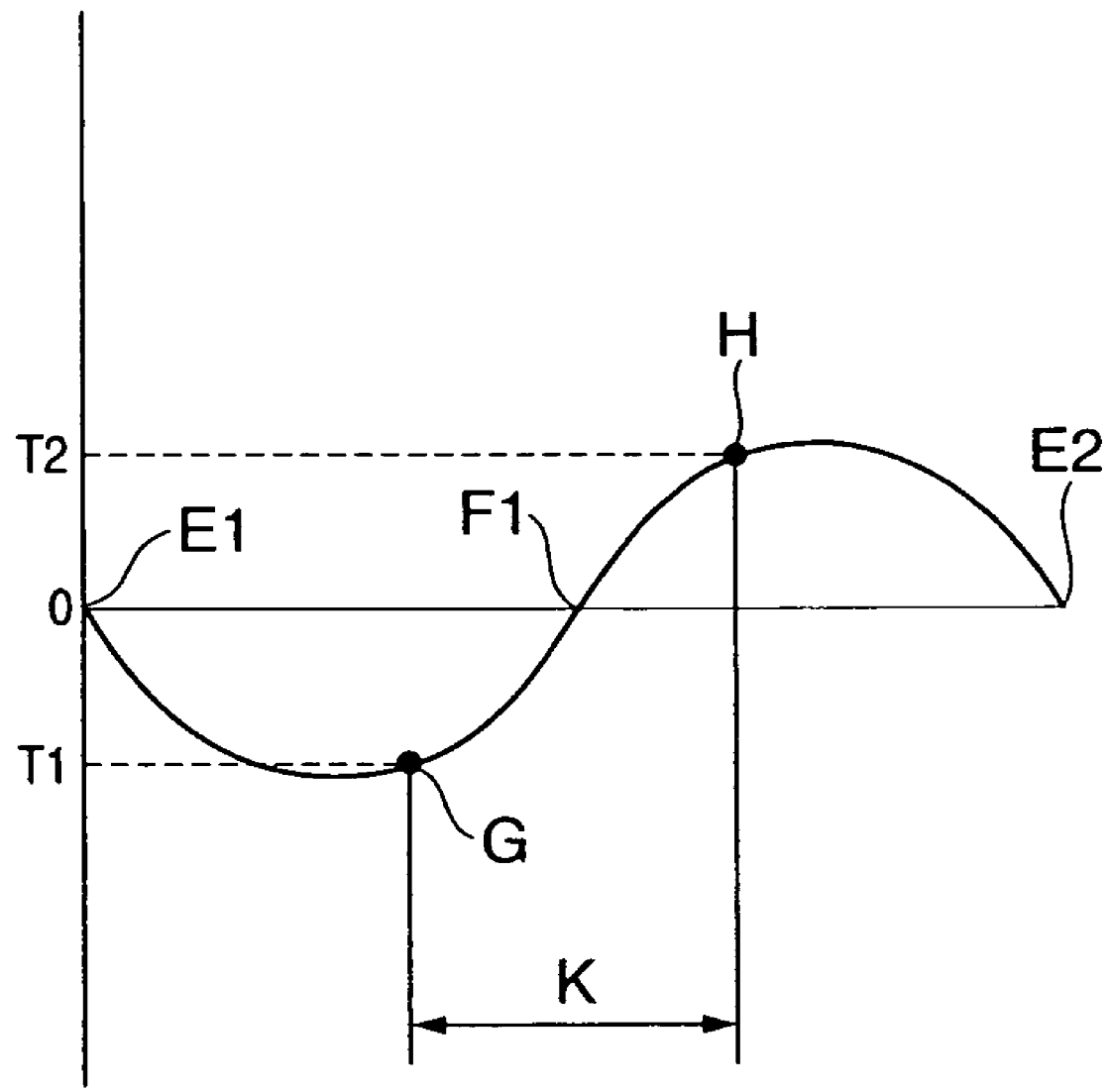
FIG. 5 is a graph explaining cogging torque in the driving apparatus according to the embodiment.

FIG. 5 shows cogging torque in the driving apparatus according to the present embodiment. The graph shows rotation positions of the magnet 8 when the first and second coils 4 and 5 are not energized and how the magnet 8 is pulled by the first magnet facing portion 1a and the second magnet facing portion 2a.

The ordinate in FIG. 5 indicates a magnetic force (cogging torque) generated between the first magnet facing portion 1a and the second magnet facing portion 2a acting on the magnet 8, and the abscissa indicates a rotation phase of the magnet 8. At points E1 and E2 respectively, if the magnet tries to rotate in the normal direction, a minus force acts to return the magnet to the original position, and if the magnet tries to rotate in the reverse direction, a plus force acts to return the magnet to the original position. In other words, points E1 and E2 are a cogging stop position where the magnet is stably positioned by the magnetic force between the magnet and the outer magnetic poles. Point F1 is an unstably balanced stop position. If the magnet's phase deviates by a small amount, a force acts to rotate the magnet to point E1 or E2 in the vicinity. When the first and second coils 4 and 5 are not energized, the magnet does not stop at point F1 because of vibrations or changes in the posture, but stops at point E1 or E2.

The cogging stable point, such as points E1 and E2, exits in the cycle of 360/n degrees, assuming that the number of magnetic pole is n (in this embodiment n=2, therefore 180 degrees). The intermediate position of points E1 and E2 is the unstable point, such as point F1.

Herein, assume that a stopper is provided to set the rotation range to K degrees with unstable point F1 as the substantial midpoint of the rotation range as shown in FIG. 5. At point G which is the stopper position (one end of the rotation range), cogging retention torque T1 at the time of not energizing coils is generated. At point H which is the stopper position (the other end of the rotation range), cogging retention torque T2 at the time of not energizing coils is generated.

As a result of numerical simulation using a finite element method, it has become clear that the pulling state between the magnet and the outer magnetic poles in a non-energized state of coils changes in accordance with the angle of the magnetized pole and the angle of the outer magnetic pole facing the magnet. According to this, the cogging torque of the magnet changes in accordance with the angle of the outer magnetic pole facing the magnet. This is shown in FIGS. 6A and 6B.

Figure 6A:
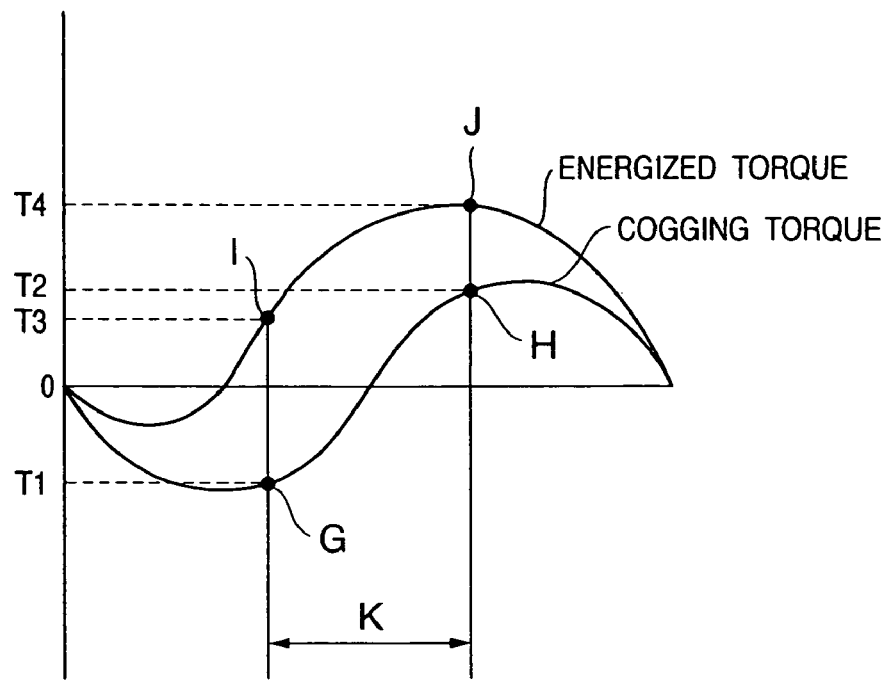
FIGS. 6A and 6B are graphs explaining a relation among a face width of an outer magnetic pole portion, cogging torque, and energized torque.
Figure 6B:
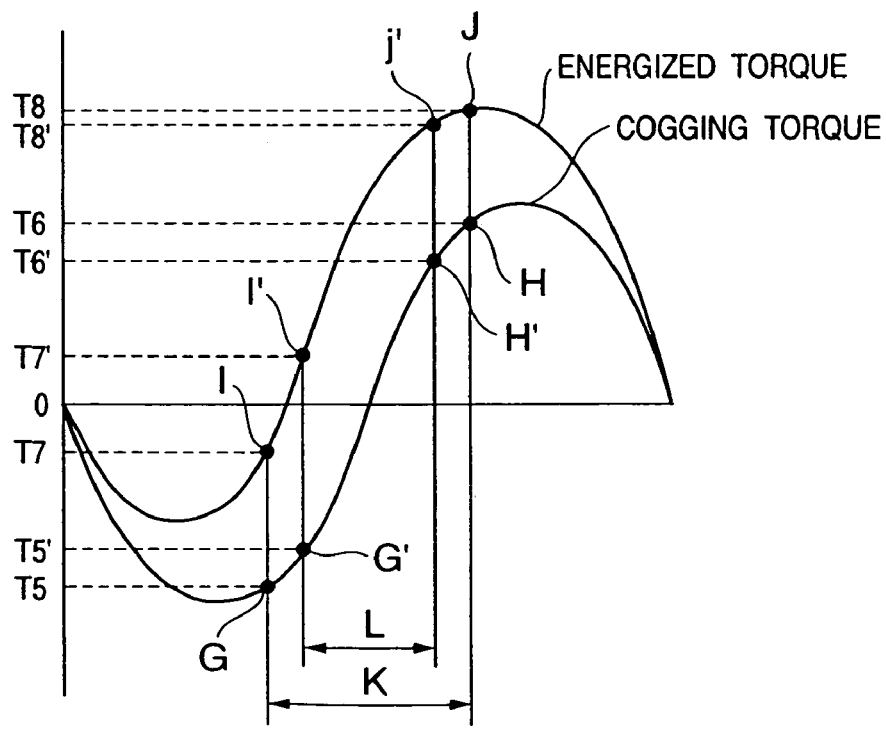

FIGS. 6A and 6B explain a relation among the face width of the outer magnetic pole portion, cogging torque, and energized torque. Shown in FIG. 6A is waveforms of cogging torque and torque upon energizing coils, obtained in a case where the face width of the outer magnetic pole portion, i.e., the angle of the first and second magnet facing portions 1a and 2a opposite to the magnet 8 is large. Shown in FIG. 6B is waveforms of cogging torque and torque upon energizing coils, obtained in a case where the angle of the first and second magnet facing portions 1a and 2a opposite to the magnet 8 is small. In both drawings, the ordinate indicates torque and the abscissa indicates a rotation phase of the magnet 8.

In FIG. 6A, the face width of the outer magnetic pole portion, i.e., the angle of the first and second magnet facing portions 1a and 2a opposite to the magnet 8 is set to 120 degrees. Assuming that the rotation angle is K degrees in FIG. 6A, cogging torque T1 is generated at point G which is one end of the rotation range in non-energizing state, and cogging torque T2 is generated at point H which is the other end of the rotation range. In this stage, if the first and second coils 4 and 5 are normally energized when the magnet is at point G, energized torque T3 is generated at point I. If the first and second coils 4 and 5 are normally energized when the magnet is at point H, energized torque T4 is generated at point J. In other words, when the first and second coils 4 and 5 are normally energized, energized torque as represented by the line from point I to point J is generated in accordance with the rotation phase of the magnet 8. Since the same description applies in a case where the direction of electric application is reversed, the description thereof is omitted.

In FIG. 6B, the face width of the outer magnetic pole portion, i.e., the angle of the first and second magnet facing portions 1a and 2a opposite to the magnet 8 is set to 60 degrees. Assuming that the rotation angle is K degrees in FIG. 6B as similar to FIG. 6A, cogging torque T5 is generated at point G which is one end of the rotation range in non-energizing state, and cogging torque T6 is generated at point H which is the other end of the rotation range. In this stage, if the first and second coils 4 and 5 are normally energized when the magnet is at point G, energized torque T7 is generated at point I. If the first and second coils 4 and 5 are normally energized when the magnet is at point H, energized torque T8 is generated at point J. In other words, when the first and second coils 4 and 5 are normally energized, energized torque as represented by the line from point I to point J is generated in accordance with the rotation phase of the magnet 8. Herein, since T7 has a negative value, no rotation force toward point J is generated (reverse rotation force is generated). Because the angle of the first and second magnet facing portions 1a and 2a opposite to the magnet 8 is small, the cogging torque becomes too large, and as a result, the energized torque which is a combined value of the cogging torque and the torque generated by the coil becomes a negative value when the magnet starts moving. In this case, the voltage applied to the coils must be increased to start rotation. On the other hand, if the rotation range is reduced and the rotation angle is set to L degrees as shown in FIG. 6B, cogging torque T5' is generated at point G which is one end of the rotation range in nonenergizing state, and cogging torque T6' is generated at point H which is the other end of the rotation range. In other words, the cogging torque at both ends of the rotation range declines, compared to the case where the rotation angle is set to K degrees. In this stage, if the first and second coils 4 and 5 are normally energized when the magnet is at point G, energized torque T7' is generated at point I'. If the first and second coils 4 and 5 are normally energized when the magnet is at point H, energized torque T8' is generated at point J'. In other words, when the first and second coils 4 and 5 are normally energized, energized torque always having a positive value as represented by the line from point I' to point J' is generated in accordance with the rotation phase of the magnet 8, thus stably rotating the magnet.

As described above, when the angle of the first and second magnet facing portions 1a and 2a opposite to the magnet 8 is too small, the cogging torque becomes too large, causing troubles in rotation of the magnet. Therefore, it is necessary to adjust the angle of the outer magnetic pole portions opposite to the magnet in accordance with the voltage of electric application, the rotation angle, the size of the magnet, and so forth.

The present embodiment attempts to optimize the angles by setting the angle of the first and second magnet facing portions 1a and 2a opposite to the magnet 8 to 120 degrees, and setting the angle of the first and second coil insertion portions 1b and 2b to 60 degrees. Even if the angle of the first and second coil insertion portions 1b and 2b is set to 120 degrees, the same cogging torque can be obtained. However, in this case, the size of the outer shape of the first and second coils 4 and 5 increases, resulting in an enlarged driving apparatus. By maintaining α>β as shown in FIGS. 3 and 4, the cogging torque waveform and the energized torque waveform shown in FIG. 6A can be obtained, and driving within the rotation range can efficiently be performed without increasing the size of the driving apparatus.

Figure 7:
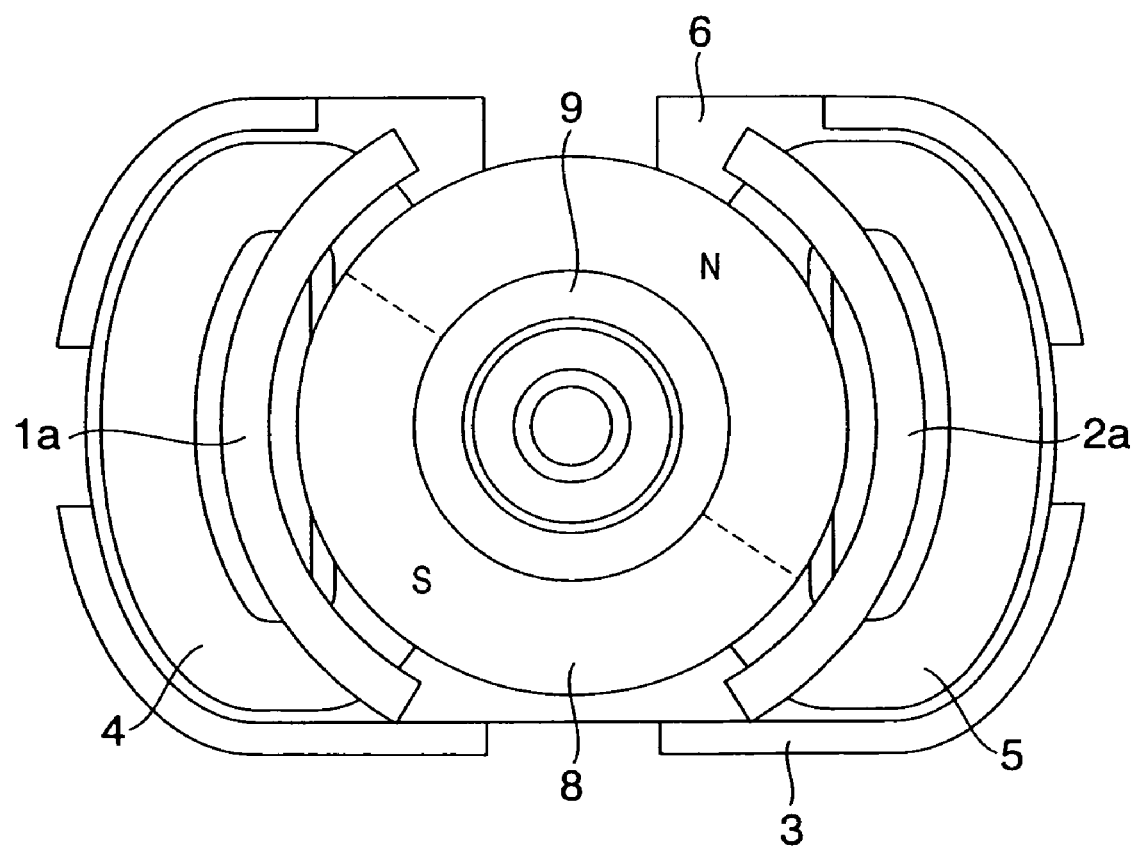
FIG. 7 is a top view showing a phase relation of the magnet and the outer magnetic pole portion.

FIG. 7 is a top view showing a positional relation between the magnet 8 and the first magnet facing portion 1a of the first outer magnetic pole portion 1 as well as the second magnet facing portion 2a of the second outer magnetic pole portion 2. For ease of understanding, the cover 11 and the lever 10 are removed from the driving apparatus shown in FIGS. 1 to 4. As can be seen from FIG. 7, the outer circumferential surface of the magnet 8 is divided into two in the circumferential direction and magnetized to the south pole and the north pole, thereby forming a magnetized portion.

Hereinafter, the positional relation between the magnet 8 and the first magnet facing portion 1a as well as the second magnet facing portion 2a is described.

The first magnet facing portion 1a and the second magnet facing portion 2a are arranged with 180-degree phase deviation with the rotation center of the magnet 8 as a reference. Therefore, when the outer circumferential surface of the magnet 8 magnetized to the south pole faces the first magnet facing portion 1a, the outer circumferential surface of the magnet 8 magnetized to the north pole faces the second magnet facing portion 2a. When the outer circumferential surface of the magnet 8 magnetized to the north pole faces the first magnet facing portion 1a, the outer circumferential surface of the magnet 8 magnetized to the south pole faces the second magnet facing portion 2a. When the angles of the first and second magnet facing portions 1a and 2a with respect to the magnet 8 are equal, the phase ratios thereof are equal.

Furthermore, the first coil 4 and the second coil 5 have different winding directions and are connected in series. By energizing the first and second coils 4 and 5, the first outer magnetic pole portion 1 and the second outer magnetic pole portion 2 are excited to opposite poles. In other words, a magnetic force generated by energizing the first and second coils 4 and 5 serves as a rotation force for rotating the magnet 8 in one direction. In the driving apparatus disclosed in Japanese Patent Application Laid-Open No. 2002-049076, the outer magnetic pole portion is ½ of the number of the magnetic poles of the magnet (there are two poles in the magnet but there is one outer magnetic pole portion in No. 2002-049076). Therefore, the driving apparatus has poor rotation balance, and the rotation angle is small. On the contrary, according to the present embodiment, since the magnet has two poles and two outer magnetic pole portions are provided, a large rotation angle can be secured, and excellent rotation balance can be achieved.

Hereinafter, the relation between the number of poles of the magnet and a rotatable angle is briefly described. In the driving apparatus disclosed in Japanese Patent Application Laid-Open No. 2002-049076 and the driving apparatus of the present embodiment, when the number of poles of the magnet is N, the rotatable angle is about 360/N degrees (in reality, the rotation angle is smaller than this angle because of an influence of friction or a relation with a load). Therefore, when the magnet has two poles, in theory the magnet can rotate close to 180 degrees. When the magnet has four poles, the magnet can rotate half of this angle, i.e., 90 degrees. In the driving apparatus of the present embodiment, since the magnet has two poles, a large rotation angle can be secured. Note that setting of the rotation angle in the driving apparatus is determined in view of the necessary torque. In other words, if a large rotation angle is set in a driving apparatus, the torque at the beginning of movement is small; whereas if a small rotation angle is set, the torque at the beginning of the movement is large.

Figure 8:
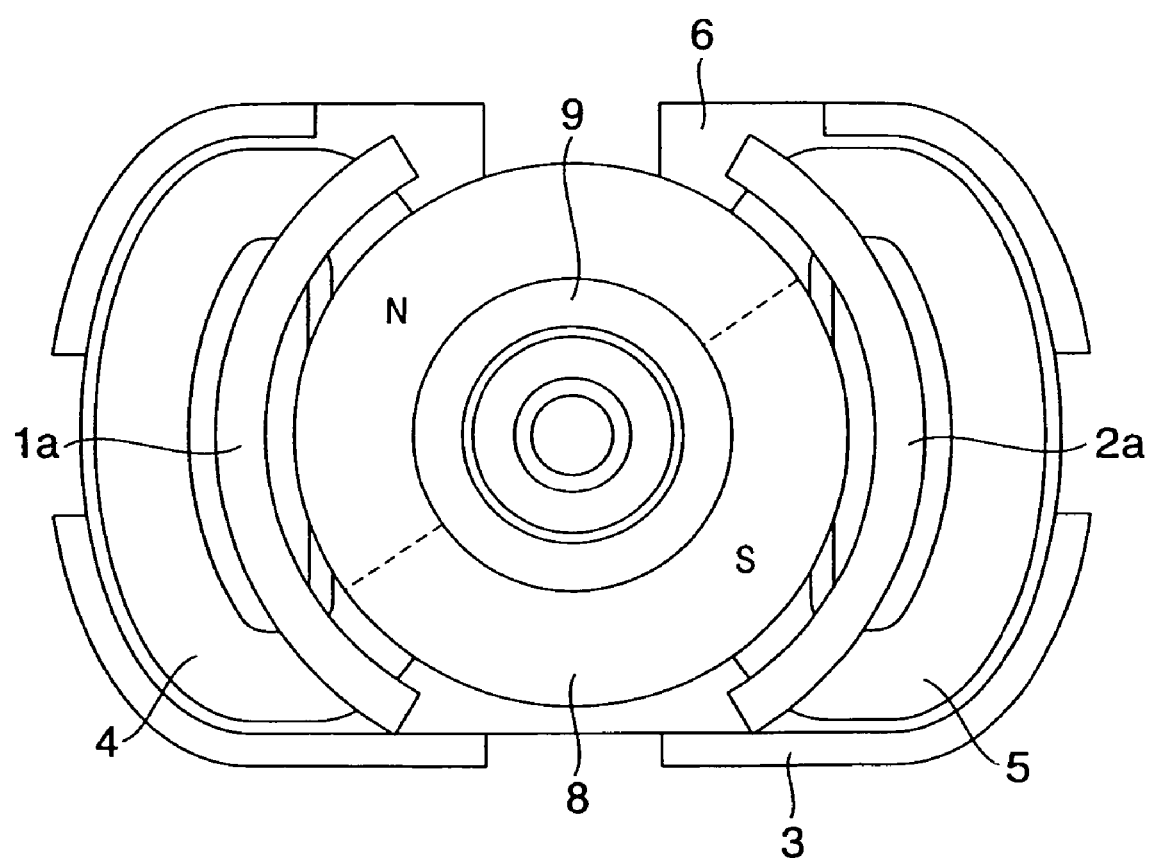
FIG. 8 is a top view showing a state in which the direction of electric application to coils is switched from the state of FIG. 7 to rotate the magnet.

Next, an operation of the driving apparatus according to the present embodiment is described with reference to FIGS. 7 and 8.

FIG. 7 shows a driving apparatus in which the first coil 4 and the second coil 5 are energized in a way that the first outer magnetic pole portion 1 is magnetized to the north pole, the first inner magnetic pole portion (the portion of the first cylinder portion 9a and the second cylinder portion 9b that face the first magnet facing portion 1a) is magnetized to the south pole, the second outer magnetic pole portion 2 is magnetized to the south pole, and the second inner magnetic pole portion (the portion of the first cylinder portion 9a and the second cylinder portion 9b that face the second magnet facing portion 2a) is magnetized to the north pole. The magnet 8 stops its rotation in the state shown in FIG. 7 when the driving pin lob of the lever 10 integratedly rotating with the magnet 8 runs against one end of a long hole 12b of a bottom plate 12 which will be described later. While the first and second coils 4 and 5 are energized, a rotation force in the clockwise direction (in the drawing) is generated in the magnet 8 in a way that the center of the first magnet facing portion 1a meets the center of the magnetized portion of the magnet 8 (center of the south pole) and that the center of the second magnet facing portion 2a meets the center of the magnetized portion of the magnet 8 (center of the north pole). When energizing the first and second coils 4 and 5 is stopped, the magnet 8 maintains this position by virtue of the cogging force generated in the first magnet facing portion 1a and the second magnet facing portion 2a.

When the direction of electric application to the first and second coils 4 and 5 is reversed from the state shown in FIG. 7, the first outer magnetic pole portion 1 is magnetized to the south pole, the first inner magnetic pole portion (the portion of the first cylinder portion 9a and the second cylinder portion 9b that face the first magnet facing portion 1a) is magnetized to the north pole, the second outer magnetic pole portion 2 is magnetized to the north pole, and the second inner magnetic pole portion (the portion of the first cylinder portion 9a and the second cylinder portion 9b that face the second magnet facing portion 2a) is magnetized to the south pole. In this state, the magnet 8 rotates in the counterclockwise direction. The magnet 8 stops its rotation in the state shown in FIG. 8 when the driving pin 10b of the lever 10 integratedly rotating with the magnet runs against the other end of the long hole 12b of the bottom plate 12 which will be described later. While the first and second coils 4 and 5 are energized, a rotation force in the counterclockwise direction (in the drawing) is generated in the magnet 8 in a way that the center of the first magnet facing portion 1a meets the center of the magnetized portion of the magnet 8 (center of the north pole) and that the center of the second magnet facing portion 2a meets the center of the magnetized portion of the magnet 8 (center of the south pole). When energizing the first and second coils 4 and 5 is stopped, the magnet 8 maintains this position by virtue of the cogging force generated in the first magnet facing portion 1a and the second magnet facing portion 2a.

In the above-described manner, by switching the direction of electric application to the first and second coils 4 and 5, the magnet 8 together with the lever 10 reciprocatively rotates the range determined by the stopper (long hole 12b of the bottom plate 12).

Figure 9:
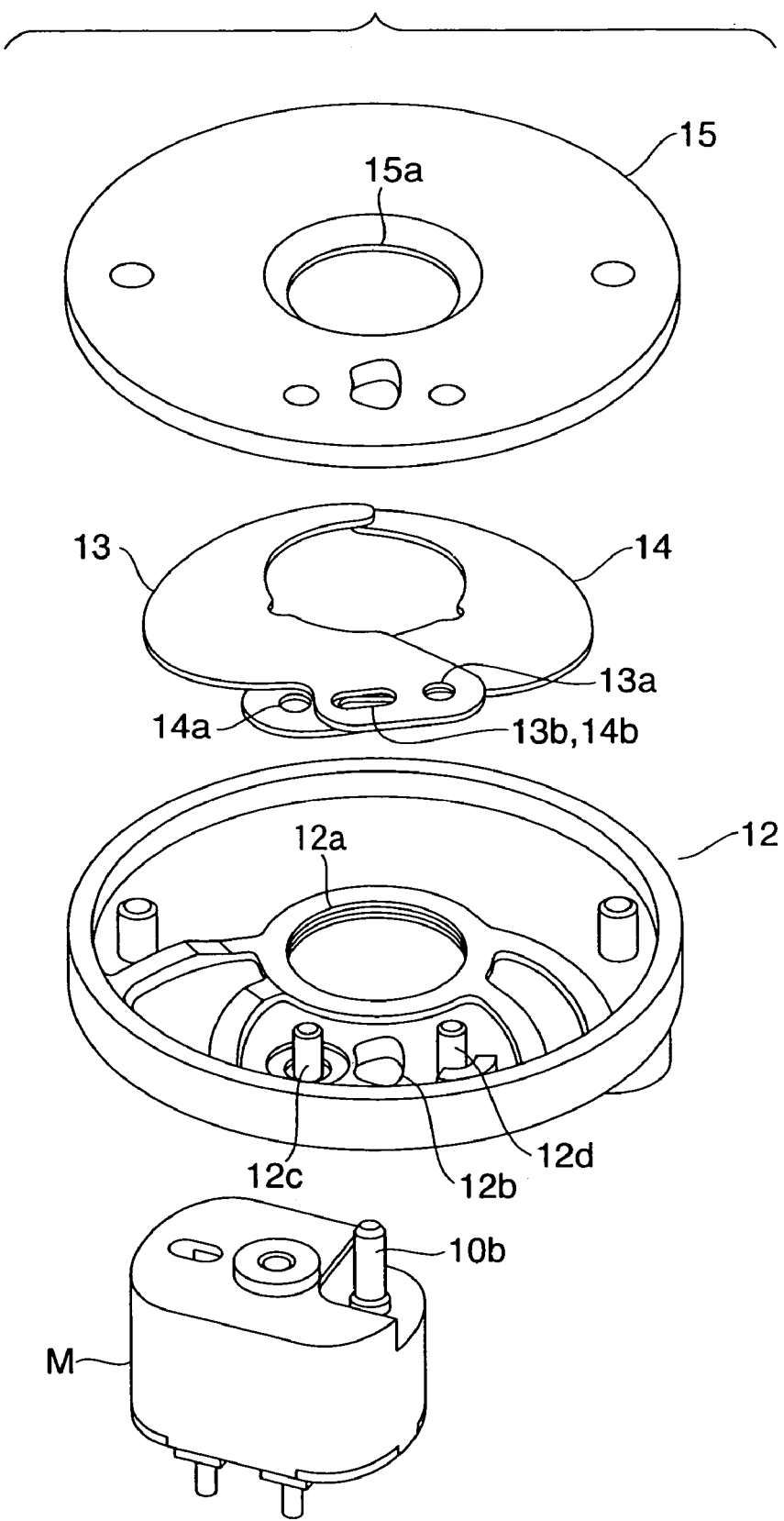
FIG. 9 is a breakdown perspective view of a shutter device employing the driving apparatus shown in FIG. 1.

FIG. 9 is a breakdown perspective view of a shutter device employing a driving apparatus M according to the present invention.

In the shutter device which is an example of the light amount adjustment apparatus according to the present invention, numeral 12 denotes a bottom plate where an opening 12a is formed in the center. The driving apparatus M is attached to the bottom plate 12 by bonding or the like. The driving pin 10b of the lever 10 in the driving apparatus M is inserted to the long hole 12b provided on the bottom plate 12. The magnet 8 is rotatable from a position where the driving pin 10b runs against one end of the long hole 12b to a position where the driving pin 10b runs against the other end of the long hole 12b. Projections 12c and 12d projecting in the same direction as the driving pin 10b are integratedly formed on the bottom plate 12.

Numerals 13 and 14 denote blades. The projection 12d of the bottom plate 12 is inserted rotatably to a circular hole 13a of the blade 13, and the driving pin 10b of the lever 10 is inserted slidably to the long hole 13b of the blade 13. Similarly, the projection 12c of the bottom plate 12 is inserted rotatably to a circular hole 14a of the blade 14, and the driving pin lob of the lever 10 is inserted slidably to the long hole 14b of the blade 14. Numeral 15 denotes a blade pressing plate having an opening 15a in the center. The blade pressing plate 15 is fixed to the bottom plate 12 while sandwiching the blades 13 and 14 with a predetermined gap, and serves as a receiver of the blades 13 and 14 in the axial direction.

When the magnet 8 rotates, the blade 13 rotates on the circular hole 13a as the driving pin 10b of the lever 10 pushes the long hole 13b, and the blade 14 rotates on the circular hole 14a as the driving pin 10b of the lever 10 pushes the long hole 14b, thereby controlling the amount of light passing through the opening 12a of the bottom plate 12.

By virtue of the short axial length of the driving apparatus M, it is possible to realize a shutter device that does not become an obstacle to other lens or components and that has not much protuberances in the optical-axis direction. Moreover, since the driving apparatus has an increased output despite its small size, high shutter speed can be achieved.

Although, in the above-described embodiment, the driving apparatus is employed as an actuator for driving the shutter blades, the driving apparatus can be employed for other purposes, e.g., for a diaphragm device, or for turning a lens-driving barrel cam at two positions. For this reason, the driving apparatus having benefits of an increased output, a small external diameter, and a short axial length is valuable. For instance, the driving apparatus can be employed effectively in the following configuration. More specifically, the driving pin 10b of the lever 10 is connected to a barrel cam (not shown) capable of turning on the optical axis. The barrel cam turns by turning the lever 10. The barrel cam includes cam portions having different heights at two positions in the optical-axis direction. By turning the barrel cam, a lens holder fixing the lens (not shown) which is inserted to the cam portion moves in the optical-axis direction.

Second Embodiment

Figure 10:
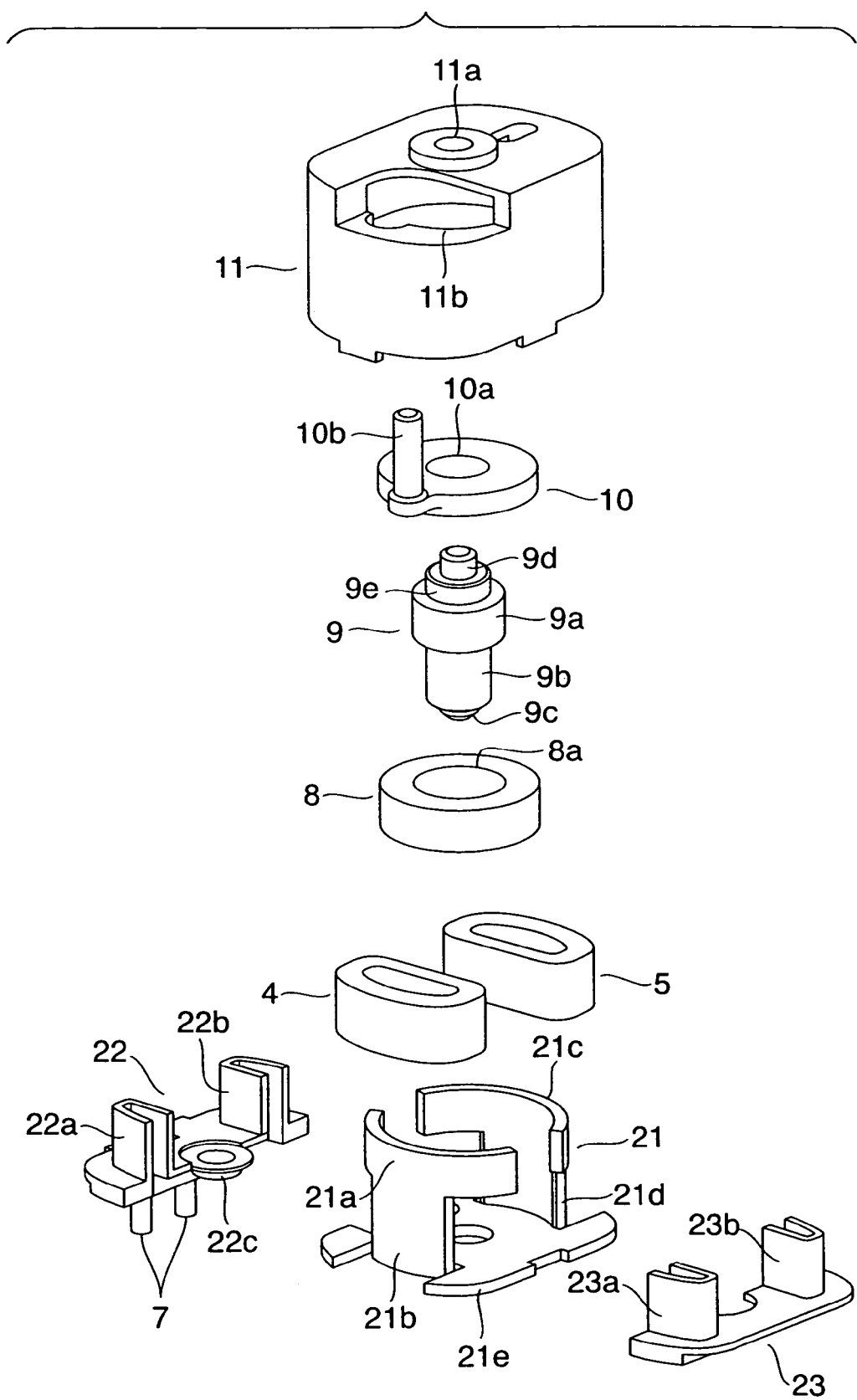
FIG. 10 is a breakdown perspective view of a driving apparatus according to the second embodiment of the present invention.
Figure 11:
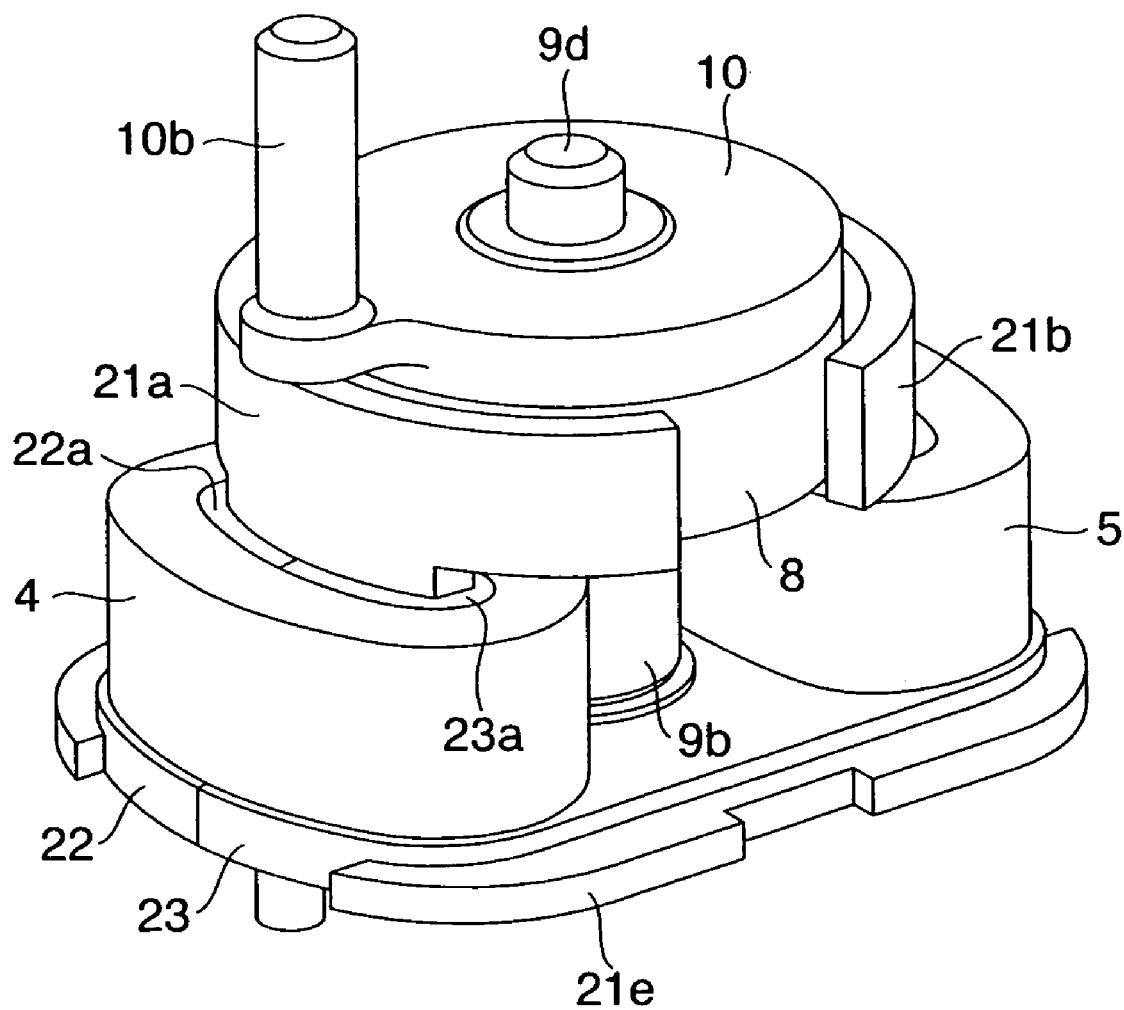
FIG. 11 is a view showing an assembled state of the driving apparatus shown in FIG. 10, excluding a cover.
Figure 13:
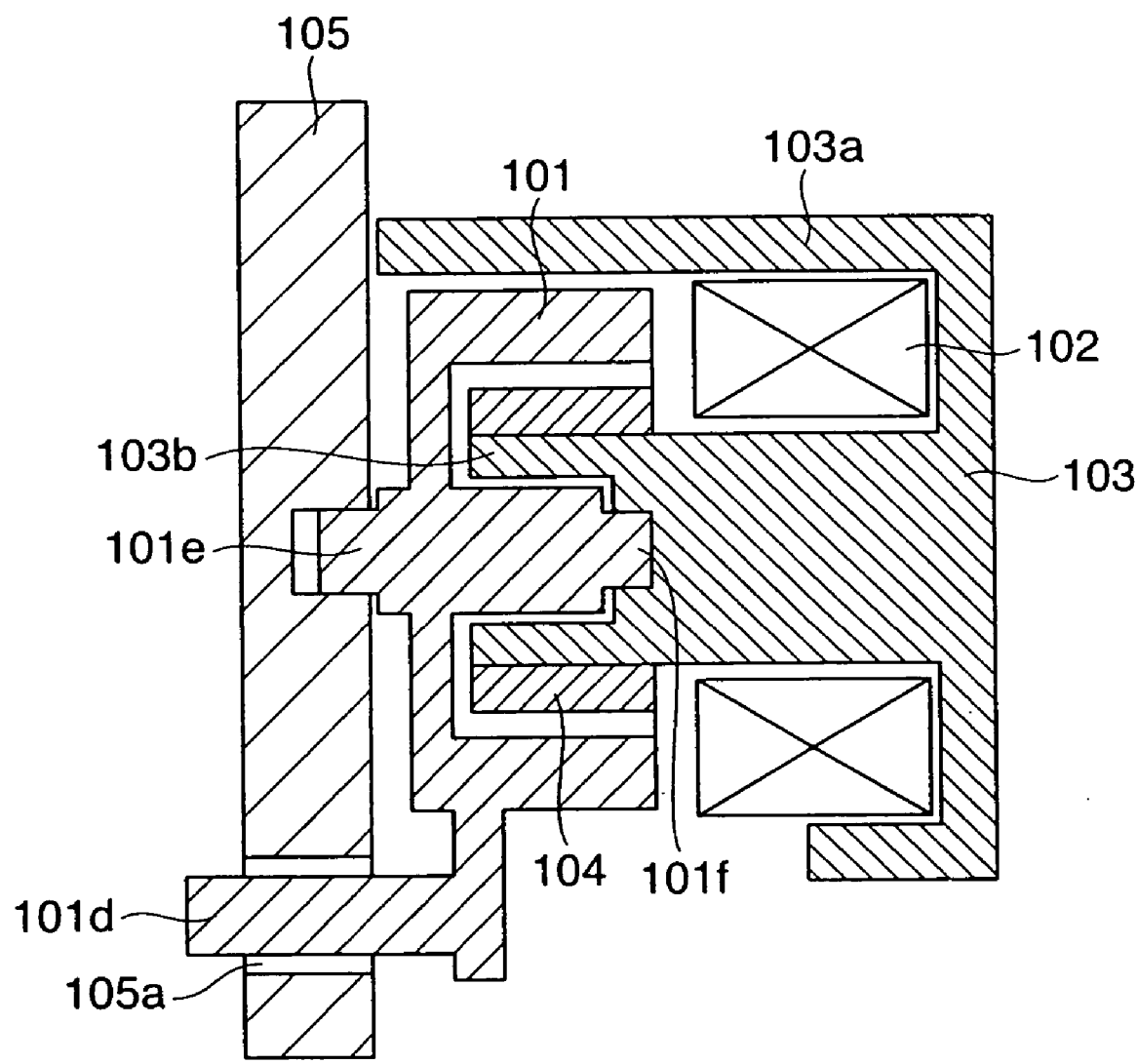
FIG. 13 is a cross-section of the driving apparatus in FIG. 12 when it is cut along the plane parallel to the rotor axis.

FIGS. 10 and 11 show a driving apparatus according to the second embodiment of the present invention. FIG. 10 is a breakdown perspective view of the driving apparatus, and FIG. 11 shows an assembled state of the driving apparatus, excluding a cover. In the following description, to the same components as those of the first embodiment, the same numerals are assigned and description thereof is omitted.

In the drawing, numeral 21 denotes a yoke formed with a soft magnetic material. The yoke 21 comprises a first magnet facing portion 21a, a first coil insertion portion 21b, a second magnet facing portion 21c, a second coil insertion portion 21d, and a connection portion 21e connecting the first coil insertion portion 21b with the second coil insertion portion 21d. These are integratedly formed by pressure molding.

Numeral 22 denotes a first bobbin; 23, a second bobbin. The first bobbin 22 comprises a first coil holder 22a, a second coil holder 22b, and a bearing 22c. The second bobbin 23 comprises a first coil holder 23a and a second coil holder 23b. The first bobbin 22 and the second bobbin 23 are assembled in the horizontal direction of FIG. 10 with the yoke 21 in the middle. Then, the first coil 4 is wound around the first coil holder 22a and the first coil holder 23a, and the second coil 5 is wound around the second coil holder 22b and the second coil holder 23b. The terminal pin 7 is buried in the bobbin 22 and connected to the coil ends of the first coil 4 and the second coil 5. In this state, the first coil insertion portion 21b is arranged in the hole formed with the first coil holders 22a and 23a around which the first coil 4 is wound, and the second coil insertion portion 21d is arranged in the hole formed with the second coil holders 22b and 23b around which the second coil 5 is wound. The bearing 22c rotatably supports the supporting axis 9c of the rotor axis 9.

According to the first embodiment, the first and second coils 4 and 5 are wound around the bobbin 6, and the first and second outer magnetic pole portions 1 and 2 are inserted to the bobbin 6 and fixed to the main yoke 3. Meanwhile, according to the second embodiment, the bobbin is divided right and left into two bodies, the first and second bobbins 22 and 23, with the outer magnetic pole portion as the center, and the bobbins are attached to the yoke 21, thereafter the first and second coils 4 and 5 are wound. Therefore in the first embodiment, because the width of the first and second magnet facing portions 1a and 2a is larger than that of the first and second coil insertion portions 1b and 2b, the yoke consists of three bodies: the first outer magnetic pole portion 1, the second outer magnetic pole portion 2, and the main yoke 3. On the contrary, in the second embodiment, although the width of the first and second magnet facing portions 21a and 21b is larger than that of the first and second coil insertion portions 21b and 21d, the first outer magnetic pole portion and the second outer magnetic pole portion can be integrated to serve as the yoke 21. Therefore, it is possible to minimize an error regarding the mutual positions of the outer magnetic pole portions, and possible to provide a driving apparatus having a small number of parts and a simple configuration. As a result, the second embodiment can achieve more cost reduction than the first embodiment.

Since the operation of the driving apparatus according to the second embodiment is similar to that of the first embodiment, descriptions thereof are omitted.

Hereinafter, effects of each of the above-described embodiments are described.

(1) The driving apparatus is configured in a way that the first outer magnetic pole portion and the second outer magnetic pole portion are excited to opposite poles. The first outer magnetic pole portion is arranged to face the outer circumferential surface of the magnet at a predetermined angle with a predetermined gap. The second outer magnetic pole portion, which is arranged with 180-degree phase deviation from the first outer magnetic pole portion with respect to the center of the magnet, is arranged to face the outer circumferential surface of the magnet at a predetermined angle with a predetermined gap.

Since the first outer magnetic pole portion and the second outer magnetic pole portion are arranged with 180-degree phase deviation with respect to the center of the magnet, as compared to the driving apparatus disclosed in Japanese Patent Application Laid-Open No. 2002-049076, it is possible to realize a driving apparatus having excellent rotation balance and achieving a large rotation angle by virtue of the magnet having two poles.

(2) Since magnetic flux generated by energizing the first coil and magnetic flux generated by energizing the second coil simultaneously act upon the magnet, the double number of turns of the coils can be attained as an overall driving apparatus without increasing the number of turns in one coil. Therefore, it is possible to realize a driving apparatus having an increased output and having a short axial length without increasing the external diameter.

(3) Defining that the rotor axis fixed to the inner circumferential surface of the magnet is called an inner magnetic pole portion, the magnetic flux generated by the first coil that passes between the inner magnetic pole portion and the first outer magnetic pole portion facing the outer circumferential surface of the magnet effectively acts on the magnet. Similarly, the magnetic flux generated by the second coil that passes between the inner magnetic pole portion and the second outer magnetic pole portion facing the outer circumferential surface of the magnet effectively acts on the magnet. In this state, since it is not necessary to provide a gap between the inner magnetic pole portion and the inner circumferential surface of the magnet, it is possible to configure a driving apparatus having a smaller distance between the outer magnetic pole portion and the inner magnetic pole portion, as compared to the driving apparatus disclosed in Japanese Patent Application Laid-Open No. 2002-049076. As a result, magnetic resistance can be reduced, and an output of the driving apparatus can be increased.

(4) Since the first inner magnetic pole portion and the second inner magnetic pole portion are configured with a rotor axis, the driving apparatus can be manufactured more easily than the case where the outer magnetic pole portion and the inner magnetic pole portion are connected or integratedly manufactured as proposed by Japanese Patent Application Laid-Open No. 2002-049076, and cost reduction can be achieved.

(5) Since the rotor axis is fixed to the internal diameter portion of the magnet, excellent mechanical strength can be attained.

(6) Because the first outer magnetic pole portion and the second outer magnetic pole portion are formed in a comb-tooth shape extended in one same direction with respect to the rotor-axis direction, the apparatus can be downsized in a direction perpendicular to the rotor-axis direction, and also coil assembly becomes easy.

(7) By virtue of the construction where the first coil and the second coil are connected in series or in parallel, only one circuit is necessary for energizing the first coil and the second coil. Therefore, cost reduction can be achieved.

(8) Since the first coil and the second coil, respectively attached to the first outer magnetic pole portion and the second magnetic pole portion, have different coil winding directions, energizing the first coil and the second coil can excite the first outer magnetic pole portion and the second outer magnetic pole portion to opposite poles.

(9) By virtue of configuring each of the first outer magnetic pole portion and the second outer magnetic pole portion with the coil insertion portion and the magnet facing portion respectively, the width of the magnet facing portion can be made larger than the width of the coil insertion portion. Therefore, a large facing angle of the magnet facing portion can be secured while maintaining the external diameter of the coil. Accordingly, flexibility increases in adjusting the cogging torque generated by the magnet and the outer magnetic pole portion. In other words, optimization of the driving apparatus can easily be achieved.

Moreover, effects of the second embodiment are described below.

(10) The bobbin is divided right and left into two bodies with the outer magnetic pole portion as the center, and the bobbins are assembled while making the magnet facing portion wider than the coil insertion portion, thereafter the first and second coils 4 and 5 are wound. Accordingly, the first outer magnetic pole portion and the second outer magnetic pole portion can be configured as one member. Therefore, it is possible to minimize an error regarding the mutual positions of the outer magnetic pole portions, and possible to provide a driving apparatus having a small number of parts and a simple configuration. As a result, cost reduction can be achieved.

As is apparent from the above description, it is possible to provide a driving apparatus having a small size and a small axial length, which can be manufactured at low cost, achieve an increased output, secure a large rotation angle, and realize stable driving. Furthermore, by employing the driving apparatus as a light amount adjustment apparatus such as a shutter device or a lens driving apparatus, it is possible to secure a large operation angle in a shutter blade, a lens barrel or the like, while achieving downsizing, cost reduction, and an increased output.

The present invention is applicable to various apparatuses where a large rotation angle (operation angle) of a member being driven is desirable, and where excellent rotation balance is desirable.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2004-199402 filed on Jul. 6, 2004, the entire contents of which are hereby incorporated by reference herein.

What is claimed is:

1. A driving apparatus comprising:

a magnet that is cylindrical and is magnetized to two poles in a circumferential direction and fixed to a rotor axis of which an inner circumferential surface is formed with a soft magnetic material;

first and second coils arranged on a same side as said magnet with respect to an axial direction of said magnet and arranged adjacent to an end surface of said magnet in the axial direction;

a first outer magnetic pole portion excited by energizing said first coil;

a second outer magnetic pole portion excited to a pole opposite to said first outer magnetic pole portion by energizing said second coil; and a yoke portion formed with a soft magnetic material for supporting said first and second outer magnetic pole portions, wherein said first outer magnetic pole portion includes, in the axial direction of said magnet, a first coil insertion portion that is inserted to an internal diameter portion of said first coil, and a first magnet facing portion that is arranged to face a magnetized outer circumferential portion of said magnet with a predetermined gap at a predetermined angle, with the first coil insertion portion and the first magnet facing portion being integratedly formed adjacent to the axial direction of the rotor axis and extending in parallel with the axial direction of the rotor axis, said second outer magnetic pole portion includes a second coil insertion portion that is inserted to an internal diameter portion of said second coil, and a second magnet facing portion that is arranged to face a magnetized outer circumferential portion of said magnet with a predetermined gap at a predetermined angle, with the second coil insertion portion and the second magnet facing portion being integratedly formed adjacent to the axial direction of the rotor axis and extending in parallel with the axial direction of the rotor axis, and said rotor axis is arranged adjacent to outer circumferential portions of said first and second coils and forms a first inner magnetic pole portion and a second inner magnetic pole portion, with said first inner magnetic pole portion excited by energizing said first coil and said second inner magnetic pole portion excited by energizing said second coil, with said rotor axis further comprising first and second cylinder portions in the axial direction, with the first cylinder portion facing with the first and second magnet facing portions through an intermediary of a stationary magnet, and the second cylinder portion being adjacent to the outer circumferential portions of said first and second coils, and wherein a facing angle of said first magnet facing portion that faces said magnet is larger than a facing angle of said first coil insertion portion that faces the rotor axis, and a facing angle of said second magnet facing portion that faces said magnets is larger than a facing angle of said second coil insertion portion that faces the rotor axis.

2. The driving apparatus according to claim 1, wherein said first and second coils are connected in series, and have different winding directions.

3. The driving apparatus according to claim 1, wherein said driving apparatus forms three magnetic circuits: a first magnetic circuit formed with said first coil, said first outer magnetic pole portion, said magnet and said rotor axis, and said yoke portion; a second magnetic circuit formed with said second coil, said second outer magnetic pole portion, said magnet and said rotor axis, and said yoke portion; and a third magnetic circuit formed with said first coil, said second coil, said first outer magnetic pole portion, said magnet and the rotor axis, said second outer magnetic pole portion, and said yoke portion.

4. The driving apparatus according to claim 1, further comprising a bobbin portion around which said first and second coils are wound, wherein each of said coils is held on a same plane of said yoke portion through an intermediary of said bobbin portion.

5. The driving apparatus according to claim 4, wherein said bobbin portion comprises a first bobbin piece and a second bobbin piece, and the respective bobbin pieces are combined and assembled to said yoke portion.

6. A light amount adjustment apparatus comprising:

said driving apparatus as set forth in claim 1;

an output member that operates in accordance with rotation of said magnet; and an open-and-close member, connected to said output member, for changing the amount of light that passes through an opening by altering an area of the opening in accordance with an operation position of said output member.

* * * * *

UNITED STATES PATENT AND TRADEMARK OFFICE
CERTIFICATE OF CORRECTION

PATENT NO. : 7,304,408 B2 Page 1 of 1
APPLICATION NO. : 11/167183
DATED : December 4, 2007
INVENTOR(S) : Masao Mizumaki It is certified that error appears in the above-identified patent and that said Letters Patent is hereby corrected as shown below:

On the title page, item:
[56] REFERENCES CITED:

FOREIGN PATENT DOCUMENTS, "JP 200152591 A * 5/2000" should read --JP 2001-52591 A * 5/2000--.

COLUMN 12:

Line 50, "pin lob" should read --pin 10b--.

COLUMN 13:

Line 52, "pin lob" should read --pin 10b--.

Signed and Sealed this

Third Day of February, 2009

JOHN DOLL
*Acting Director of the United States Patent and Trademark Office*